March 2, 1943.  H. HANSEN  2,312,408
CONTACT SPRING ASSEMBLY
Filed Dec. 4, 1941
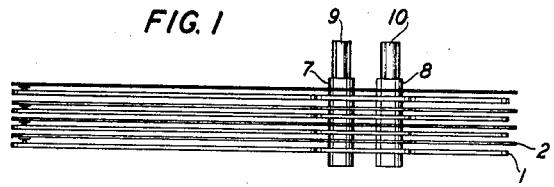
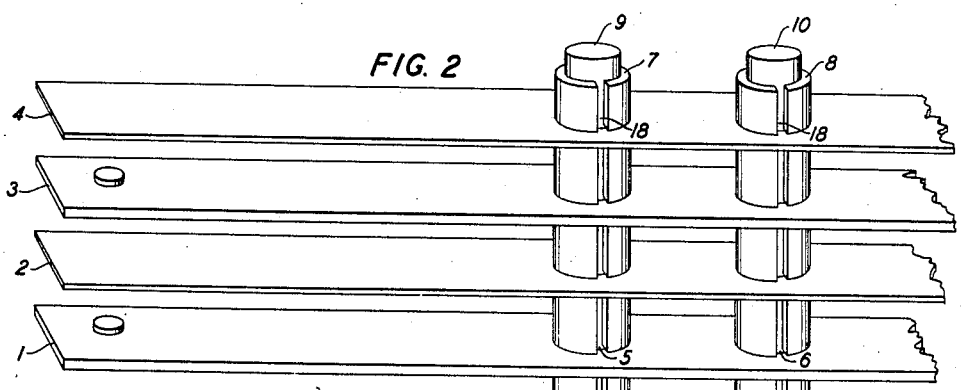
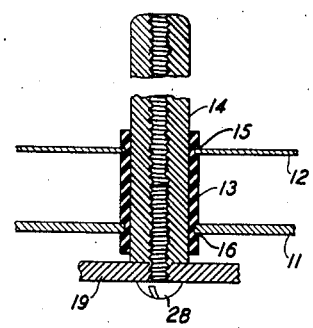
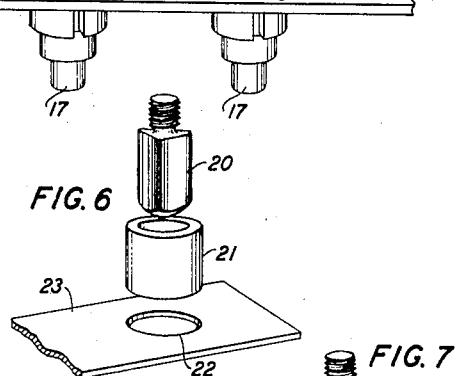
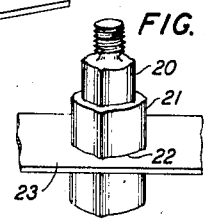
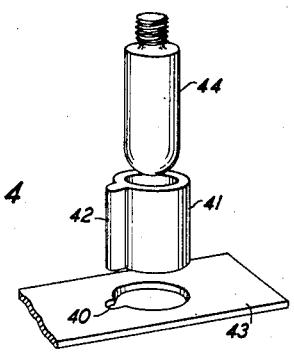
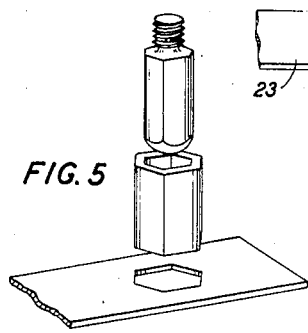
INVENTOR
H. HANSEN
BY P. C. Smith
ATTORNEY Patented Mar. 2, 1943

2,312,408

UNITED STATES PATENT OFFICE 2,312,408

CONTACT SPRING ASSEMBLY

Harry Hansen, Clifton, N. J., assignor to Bell Telephone Laboratories, Incorporated, New York, N. Y., a corporation of New York Application December 4, 1941, Serial No. 421,573

7 Claims. (Cl. 200—166)

This invention relates to contact spring arrangements and has for an object to facilitate the assembly of such springs to form terminal units.

Heretofore, in the assembling of contact springs, it has been customary to build up a pile of alternate sheets of conducting and insulating material and to clamp the whole together by means of screws which may also require insulation in the form of bushings. In such an arrangement, slight variations in thickness of the insulating layers may produce a cumulative error of troublesome proportions.

The present invention contemplates a method of assembling contact springs wherein the springs are held in fixed position, insulating bushings are inserted in aligned holes in the springs and a solid pin is inserted in the bushing, the pin being of such size as to cause the bushing to flow around and grip the springs.

As a means of preventing rotation of the spring, when it is undesirable to employ more than one bushing, the hole and bushing may be so shaped that the springs are locked in alignment thereby. Where desirable, the pin may also be formed to cooperate with the bushing and hole.

These and other features of the invention will be more apparent from a consideration of the following description in connection with the drawing in which:

Fig. 1 shows a side view of a relay spring pile-up;

Fig. 2 shows a magnified view of a set of springs;

Fig. 3 shows a pair of springs broken away to show an alternative method of mounting the spring pile-up;

Figs. 4, 5 and 6 show springs having holes of different shapes, together with suitable bushings and pins;

Fig. 7 shows another modified pin and bushing construction.

Referring first to Fig. 2, each of the spring laminations 1 to 4 has two circular holes such as 5 and 6 formed therein. The laminations are held at the desired distances from each other and with the holes of the springs in alignment. Any suitable means may be used for this purpose, such as spacers of the proper thickness, etc. The bushings 7 and 8 which are of such size as to fit closely in the holes 5 and 6 of the springs 1 to 4, are then inserted in the aligned holes and held there by any suitable means after which the solid metallic pins 9 and 10 are inserted in the bushings. Each of the bushings 7 and 8 has a longitudinal split 18 to permit the expansion of the bushing due to the insertion of the pin.

The pins 9 and 10 are slightly larger in diameter than the inside diameter of the bushings 7 and 8 and the material of the bushing is selected so that when the pins are forced into the bushing, the material of the bushing will flow between the laminations to form ridges which securely fasten the laminations in position and form the whole into a complete assembly such as shown in Fig. 1. A suitable material for the bushings is hard rubber. The spacers are then removed.

The pins may be allowed to project above the spring pile-up as shown in Fig. 1 or may have a reduced portion as at 17 of Fig. 2 to mount the spring pile-up in relation to the armature and operating coil. This same method is, of course, applicable to the assembling of terminal bank wiper springs and also to terminal strips such as are used on distributor frames.

An alternative method of mounting a spring pile-up is shown in Fig. 3 which is a cross section through two spring laminations 11 and 12, a bushing 13, and a pin 14 which is tubular in form, to provide a threaded opening to receive a screw 28 by which the pile-up is held on base 19. This figure also shows the ridges 15 and 16 formed on bushing 13 due to the internal pressures exerted by pin 14, by which the laminations 11 and 12 are held in place.

In Figs. 6 and 7 is shown a modification in which, by using a pin 20 of substantially triangular cross section in a circular bushing 21 and hole 22, a solid bushing may be used in place of the split bushing of Figs. 1 and 2. In this arrangement the bushing 21 is deformed sufficiently to securely locate and fasten the spring 23, but not enough to cause the bushing to crack. The dimensions of the pin 20 with relation to bushing 21 are made such that no material increase in the mean circumference of the bushing results when the pin 20 is driven home.

In certain cases it may not be convenient to fasten a set of springs at a plurality of points as shown in Figs. 1 and 2. With a single circular bushing, there is a possibility that with age and use, the contact springs may work out of alignment. To prevent this, as shown in Fig. 4, the hole may be formed with one or more extensions 40 and the bushing 41 formed with corresponding ribs 42 which enter the extensions 40 whereby the spring 43 is held against rotation on the bushing 41 as well as being locked in place along the bushing by the insertion of pin 44 therein.

Fig. 5 shows another shape of hole, bushing and pin which both permits the use of a solid bushing and guards against rotation.

As above mentioned, this method of assembly affords the advantage of eliminating the cumulative effects of thickness variations in sheet insulators. In addition the work of assembling spring pile-ups is simplified and the number of parts required is reduced over previous methods. Furthermore, since the position of the contact springs in a pile-up can be fixed and held to very close limits, the subsequent adjustment is eliminated or reduced.

What is claimed is:

1. A method of assembling contact springs comprising arranging the springs at the desired spacing with the holes therein in alignment, inserting an insulating bushing in said holes and forcing a solid pin into said insulating bushing to cause said bushing to expand and grip said springs.

2. A contact spring assembly comprising a plurality of contact springs having holes therein, an insulating bushing, and a pin, said bushing being inserted in said holes and said contact springs being held in spaced relation by the deformation of said bushing due to the insertion of said pin in said bushing.

3. A contact spring assembly comprising a plurality of contact springs having holes therein, an insulating bushing of hard rubber, and a pin, said bushing being inserted in said holes and said contact springs being held in spaced relation by the deformation of said bushing due to the insertion of said pin in said bushing.

4. A contact spring assembly comprising a plurality of contact springs having holes therein, an insulating bushing and a solid pin having approximately the same circumference as the interior of said bushing but differing therefrom in configuration, said bushing being inserted in said holes and said contact springs being held in spaced relation by the deformation of said bushing due to the insertion of said pin in said bushing.

5. A contact spring assembly comprising a plurality of contact springs having holes of irregular contour therein, an insulating bushing having a cross section conforming to said irregular contour, and a pin, said bushing being inserted in said holes and said contact springs held in spaced relation by the deformation of said bushing due to the insertion of said pin to said bushing.

6. A contact spring assembly comprising a plurality of contact springs having holes therein with aligned extensions, an insulating bushing having a rib, and a pin, said bushing being inserted in said holes with said rib entering said extensions and said contact springs held in spaced relation by the deformation of said bushing due to the insertion of said pin in said bushing.

7. A contact spring assembly comprising a plurality of contact springs having holes therein, an insulating bushing, and a pin, said bushing being inserted in said holes and said contact springs being held in spaced relation by the deformation of said bushing due to the insertion of said pin in said bushing, a base, and means including said pin for mounting said assembly on said base.

HARRY HANSEN.